Figure 2:
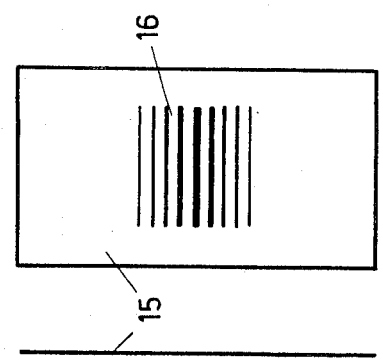

United States Patent

[11] 3,576,501

| [72] | Inventor | Christian Deutsch<br>Zollikofen, Switzerland |
|---|---|---|
| [21] | Appl. No. | 708,128 |
| [22] | Filed | Feb. 26, 1968 |
| [45] | Patented | Apr. 27, 1971 |
| [73] | Assignee | Institut Fur angewandte Physik der<br>Universitat Bern<br>Bern, Switzerland |
| [32] | Priority | Mar. 7, 1967 |
| [33] | | Switzerland |
| [31] | | 3353/67 |

[54] DIODE LASER HAVING A ROUGHENED N-ZONE JUST BELOW THE JUNCTION
3 Claims, 2 Drawing Figs.

| [52] | U.S. Cl. | 331/94.5, 317/234 |
|---|---|---|
| [51] | Int. Cl. | H01s 3/18 |
| [50] | Field of Search | 331/94.5; 317/235, 27 |

[56] References Cited
UNITED STATES PATENTS
3,431,512  3/1969  Redfield ..................... 331/94.5

Primary Examiner—Ronald L. Wibert
Assistant Examiner—Edward S. Bauer
Attorney—Ernest F. Marmorek ABSTRACT: A diode laser which has a P-zone, an N-zone and a PN-transition zone therebetween. The laser is provided with two reflecting surfaces, and at least one of these does not reflect completely. A bundle of light is generated and amplified by a direct current flowing from the P-zone to the N-zone and is reflected back and forth in the plane of the transition zone. Incomplete reflection of at least one of the surfaces is accomplished by covering or roughening a portion of the same almost, but not completely, up to the line along which a usable bundle of rays emerges.

PATENTED APR 27 1971 3,576,501

2

3,576,501

1

DIODE LASER HAVING A ROUGHENED N-ZONE JUST BELOW THE JUNCTION

The invention relates to a diode laser whose body has a P- and an N-zone, separated by a PN-transition zone, and is provided with two reflecting surfaces. At least one of these surfaces does not reflect completely. Both surfaces reflect a bundle of rays back and forth in the plane of the transition zone. The bundle is generated and amplified in this plane under the influence of a direct current flowing from the P-zone to the N-zone. Diode lasers of this kind hitherto known have had the disadvantage that interferences occur in the remote radiation field of its usable ray or rays.

It is the object of the invention to delete this drawback. This is accomplished in the following manner:

At least on one side of the line along which a usable bundle of rays emerges from the not fully reflecting surface, a portion of this surface, extending almost but not completely, to said line is roughened or covered.

The invention will be more fully explained with reference to the accompanying drawings. However, it should be understood that this is given merely by way of illustration, and not of limitation, and that it is intended to cover all modifications and variations which do not constitute departures from the spirit and the scope of the invention as hereinafter claimed.

Figure 1:
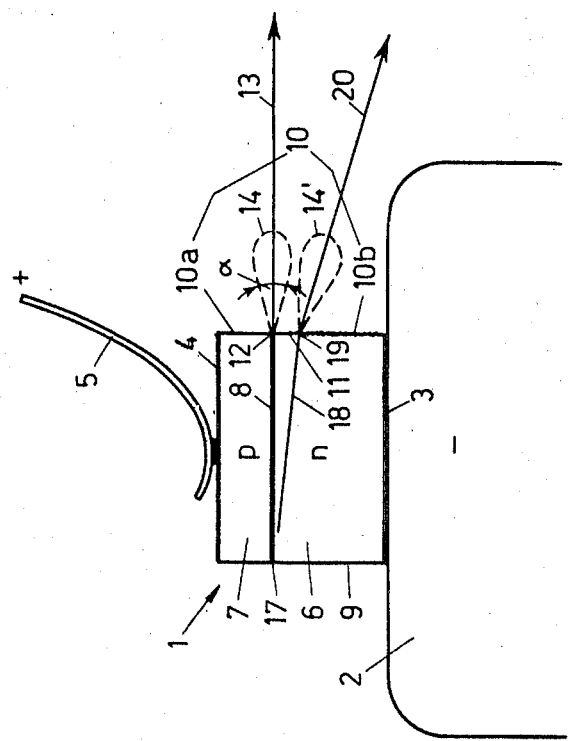

In the drawings, which are schematics,

FIG. 1 is an elevation of a measuring device containing a diode laser according to the invention; and FIG. 2 is a plan view of a screen for collecting the laser beam generated in the device shown in FIG. 1.

Referring now to these drawings, the device shown in FIG. 1 comprises a laser diode 1 fastened to an electrically conductive mounting block 2. The lower and upper surfaces of the rectangular body of diode 1 are provided with laminar electrodes 3 and 4, respectively. Electrode 4 is connected to lead 5 carrying a positive potential relative to block 2 to feed the diode 1. The latter has an N-zone 6 and a P-zone 7 which are separated from each other by the PN-transition zone 8, parallel to electrodes 3 and 4. By way of example, but not of limitation, the diode may be a gallium arsenide crystal containing as impurities tellurium in the N-zone and zinc in the P-zone. However, any other suitable diode may be employed. The edges of the diode are of lengths of, e.g., approximately 200—300 $\mu$. Lateral surfaces 9 and 10 can correspond to the cleavage planes of the crystal blank from which the diode has been split off, or they may be polished. Lateral surface 9 is completely reflective so that positively no light can emerge therefrom. Lateral surface 10 has an upper portion 10a which is in unchanged state after splitting of the diode body from the blank, and a lower portion 10b which has been roughened or, if desired, covered. The junction line 11 of portions 10a and 10b is approximately 4$\mu$ below line 12 along which the transition zone 8 of only approximately 2$\mu$ thickness intersects lateral surface 10.

Devices of this kind are not uncommon, with the exception, however, of the roughened or covered lower part 10b of lateral surface 10. This is a salient feature of the invention. A bundle of light rays is generated which passes within the PN-transition zone 8 is reflected back and forth between the reflecting surface 9 and surface 10 and, at each reflection, is amplified. Surface 10 inwardly reflects approximately 30 percent of the light. A nearly laminar usable bundle of light rays 13 emerges from the diode laser at line 12. Since the bundle 13 in fact is not truly laminar, rays also emanate from line 12 which are not in the plane of the PN-transition zone 8, as shown in the drawings by broken lines in the form of lobar ray characteristic 14. The angle of aperture of the latter may, e.g., be substantially 20°. This characteristic 14 need not be symmetrical and its maximum may be slightly below or above the plane of PN-transition zone 8. When bundle 13 is projected on screen 15 whose distance from the diode laser 1 is, e.g., 10 cm. (approximately), it should be expected that the intensity of exposure of screen 15 or of a corresponding photographic plate gradually decreases up- downwardly to zero from a central median line of greatest intensity. In actual practice, however, using known diode lasers, a pattern of interference bands is seen on screen 15, as shown schematically in FIG. 2.

The occurrence of this so-called "far field interference pattern" of known diode lasers hitherto had been explained in the belief that rays emanating from line 12 strike mounting parts, e.g., a relatively very large mounting block, to be reflected therefrom on screen 15. Albeit such an effect could occur in certain devices, it has been found that improvement of the disposition of the mountings, particularly a reduction of the size of mounting block 2, does not by itself eliminate this undesirable interference effect.

It is another object of the invention to avert the occurrence of interference pattern 16 in the diode laser 1; merely insignificant fluctuations of the intensity of exposure occur which decrease from a central maximum up- downwardly along approximately smooth curves.

This effect is explained as follows:

A portion of the rays already is dispersed on line 17 along which the PN-transition zone 8 makes contact with reflecting surface 9, so that reflected rays 18 meet the surface 10 below zone 8 along a line 19 whereby rays 18, as shown, naturally constitute an arbitrarily chosen range of the dispersed rays. In lasers of known constructions, these rays 18 also emerge as a lobar characteristic 14' from surface 11, and the emerging rays 20 interfere with usable bundle of rays 13.

In the diode laser 1 according to the invention, however, the rays 18 strike roughened (or covered) part 10b of surface 10 where the emanating rays are diffused, thus losing their coherence and being incapable of effectively interfering with the bundle 13 in the remote field.

The roughened or covered portion 10b must not extend entirely to line 12 because this would lead to disturbances in the vicinity of the PN-transition zone 8, especially refraction of the rays which constitute bundle 13. The distance of approximately 4$\mu$, as named, has been found quite suitable when roughening of part 10b is carried out by means of a device often referred to as a "wire saw," i.e., with a reciprocating wire of approximately 100$\mu$ diameter, using diamond powder, whereby the wire penetrates the body to a depth of substantially 20$\mu$.

Roughening of the upper portion 10a of surface 10 of the laser as described does not serve any useful purpose because the light rays are strongly absorbed in P-zone 7, in contrast to N-zone 6 and transition zone 8. If, however, in a diode laser of a different material both the N- and the P-zones are light-permeable, the entire surface 10, except for two small bands above and below line 12, is to be roughened or covered.

If lateral surface 9 is not reflection coated, as is the case with many known lasers, a bundle of usable rays also emerges at line 17, and it is opportune to roughen or cover the lower portion of surface 9 also. Covering of the surface can be accomplished by application of an opaque coating. In the experimental investigations leading to this invention, roughening had been preferred because it is easily carried out without the use of involved equipment.

It is to be noted that, in general, with known lasers as well as with the one according to the invention, the intensity of the rays constituting bundle 13 is not constant along outlet 12, but is more or less locally concentrated. This causes certain interferences on both sides of the pattern shown in FIG. 2. However, this effect is slight in well constructed lasers.

I claim:

1. A diode laser comprising a diode having an N-zone, a P-zone and a PN-transition zone therebetween; a first reflecting lateral surface; a second reflecting lateral surface; both said surfaces reflecting back and forth a usable bundle of rays along the plane of said transition zone; means for the supply of direct current flowing from said P-zone to said N-zone, generating and amplifying said bundle; said first lateral surface being partly reflective; at least one of the parts of said second lateral surface having a diffusive portion extending almost, but not entirely, to a line substantially corresponding to said PN-transition zone and along which said bundle emerges from said diode.

2. The diode laser as defined in claim 1, wherein said diffusive portion is a roughened surface.

3. The diode laser as defined in claim 1, wherein the diffusive portion is at a distance from said line of substantially $4\mu$.